US010079958B2

(12) United States Patent
Nomura

(10) Patent No.: US 10,079,958 B2
(45) Date of Patent: Sep. 18, 2018

(54) PRINTED MATERIAL PROCESSING DEVICE AND NON-TRANSITORY RECORDING MEDIUM STORING COMPUTER READABLE PROGRAM

(71) Applicant: KONICA MINOLTA, INC., Chiyoda-ku, Tokyo (JP)

(72) Inventor: Shoichi Nomura, Machida (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/188,814

(22) Filed: Jun. 21, 2016

(65) Prior Publication Data

US 2017/0006181 A1   Jan. 5, 2017

(30) Foreign Application Priority Data

Jul. 3, 2015 (JP) .................................. 2015-134461

(51) Int. Cl.
*G06F 15/00* (2006.01)
*G06K 1/00* (2006.01)
*H04N 1/32* (2006.01)
*H04N 1/00* (2006.01)

(52) U.S. Cl.
CPC ..... *H04N 1/32144* (2013.01); *H04N 1/00848* (2013.01); *H04N 1/00872* (2013.01); *H04N 1/32352* (2013.01)

(58) Field of Classification Search
CPC .......................................... G06T 2207/30144
See application file for complete search history.

(56) References Cited

U.S. PATENT DOCUMENTS

| | | | |
|---|---|---|---|
| 2002/0087574 A1* | 7/2002 | Walsh | G06K 9/036 |
| 2009/0244164 A1* | 10/2009 | Nakamaki | B41J 2/16579 |
| | | | 347/19 |
| 2011/0038012 A1* | 2/2011 | Massicot | H04N 1/32133 |
| | | | 358/3.28 |
| 2015/0331888 A1* | 11/2015 | Shomair | G06T 11/60 |
| | | | 382/203 |

FOREIGN PATENT DOCUMENTS

| | | |
|---|---|---|
| JP | 09240120 A | 9/1997 |
| JP | 2012061840 A | 3/2012 |

* cited by examiner

*Primary Examiner* — King Poon
*Assistant Examiner* — Michael Burleson
(74) *Attorney, Agent, or Firm* — Holtz, Holtz & Volek PC

(57) ABSTRACT

A printed material processing device includes: a feature information extracting unit configured to compare read printed-material image information obtained by reading a printed material, and extract a portion equivalent to a difference between the two sets of information as feature information; an image generating unit configured to generate an image of a mark to be additionally printed near a location of the feature information, set first information indicating a positional relationship between the mark and the feature information, set second information indicating a method of extracting the feature information and a feature quantity to be extracted from the feature information, and generate an image of code information to be additionally printed in a position on the printed material, the code information including the first information and the second information; and an image forming unit configured to additionally print the mark and the code information.

16 Claims, 11 Drawing Sheets

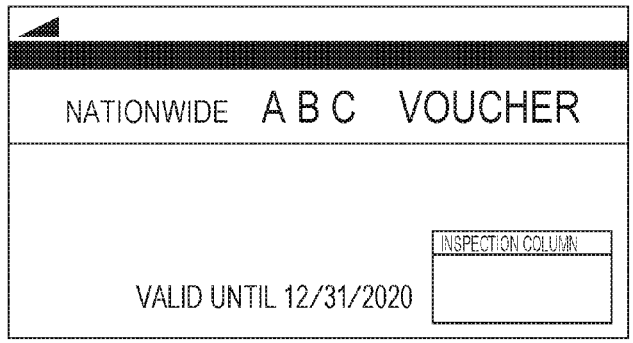
FIG. 5A
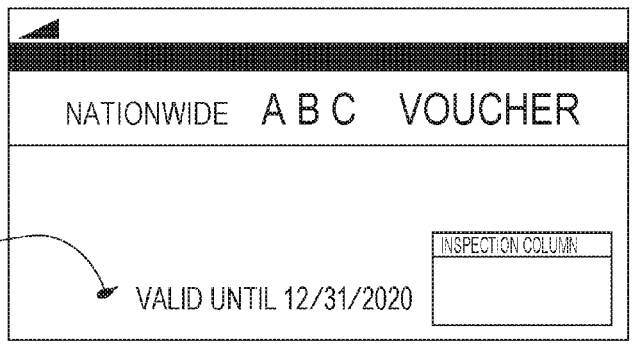
FIG. 5B
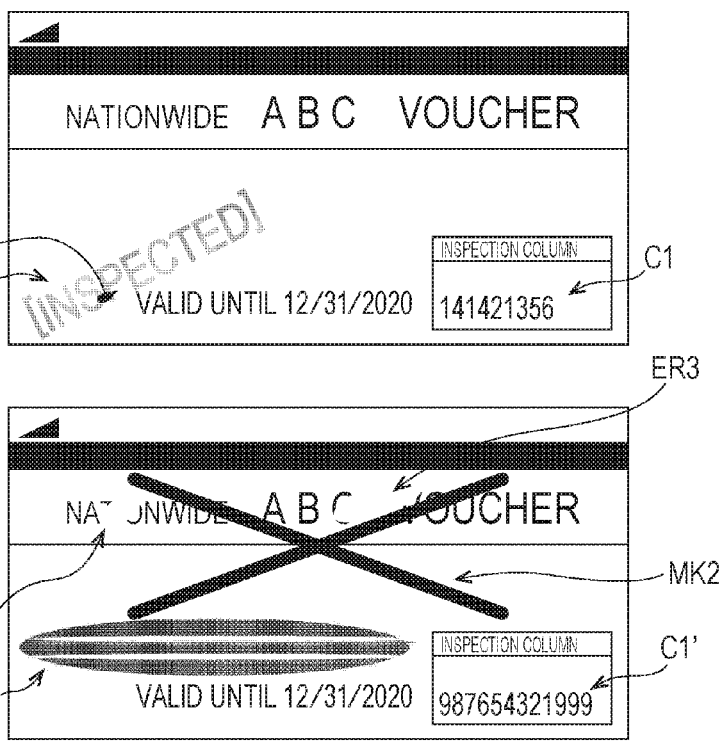
FIG. 5C
FIG. 5D

PRINTED MATERIAL PROCESSING DEVICE AND NON-TRANSITORY RECORDING MEDIUM STORING COMPUTER READABLE PROGRAM

The entire disclosure of Japanese Patent Application No. 2015-134461 filed on Jul. 3, 2015 including description, claims, drawings, and abstract are incorporated herein by reference in its entirety.

BACKGROUND OF THE INVENTION

Field of the Invention

The present invention relates to a printed material processing device and a non-transitory recording medium storing a computer readable program, and more particularly to a technology for correctly determining whether a printed material is valid.

Description of the Related Art

Printed materials with high monetary values, such as paid tickets, need to be managed under strict rules. To add more value of a ticket, the appearance of the printing surface of the ticket is also important.

A color image forming device such as an electrophotographic image forming device fully satisfies the requirements for achieving a beautiful printing surface. However, image defects, such as smudge, blurring, and missing characters, occur at a certain rate, and therefore, each printed material needs to be examined for defects For printed materials with such high values, a mechanism needs to be developed so that defective printed materials determined to be defective in examination will not be inadvertently distributed.

For example, there is a known technique by which a mark indicating that a defective printed material is invalid is printed, or a defective printed material is blacked out, or a mark indicating a defect is printed outside the print area (see JP 9-240120 A).

Further, there is the need for a mechanism for assessing authenticity of valid printed materials. For example, there is a known technique by which the image information about the mark printed on each printed material is stored in a server. When authenticity of a printed material is assessed, the image information about a predetermined portion of the printed material is transmitted to an authenticity assessment center, and the level of coincidence between the transmitted image information and the image information stored in the server is assessed (see JP 2012-61840 A).

By the technique disclosed in JP 9-240120 A, a mark indicating that a printed material is defective can be added. In some cases, however, it is difficult to accurately distinguish a defective ticket from a valid ticket inadvertently defaced by the ticket holder. If defective printed materials are distributed, some of them might be used without any problem. Furthermore, as emphasis is put on the beauty of each printed material, a printed material having even a tiny defect is detected as an invalid printed material at the time of examination. Eventually, a large number of print defects are detected, leading to increases in loss and costs.

To prevent unauthorized distribution of defective printed materials, a system may be developed to instantly shred a printed material from which a print defect is detected. However, in a case where label printing is performed on roll paper, or where tickets are collectively printed on a single paper sheet, large print loss occurs, resulting in a problem.

To prohibit reuse of a defective printed material, the entire surface of the ticket may be completely blacked out. However, due to the blacking out, the non-defective printed materials adjacent to the defective printed material might be smudged, and an extra material for the blacking out (such as ink or toner) is required, for example. In view of this, there is a demand for measures against unauthorized distribution of defective printed materials.

By the technique disclosed in JP 2012-61840 A, on the other hand, authenticity of a non-defective printed material is determined from feature information obtained from a predetermined portion of the printed material. Therefore, similar characteristics are often observed. To accurately identify these characteristics, it is necessary to store a large amount of information into a verification information server, and obtain highly precise image information at the time of authenticity assessment (validity determination). As a result, an extra load is put on the user who operates the system involving tickets as the printed materials, the determination device, and the verification information server. Furthermore, when there is no network environments to connect to a verification information server, authenticity assessment (validity determination) cannot be conducted.

SUMMARY OF THE INVENTION

An object of the present invention is to provide a printed material processing method and a printed material processing device that can determine whether a printed material is valid, without the need of strict determination on printed material validity and a certain communication environment such as a verification information server.

Embodiments of the present invention developed to solve the above problems are as follows.

(1) To achieve the abovementioned object, according to an aspect, in a printed material processing device and a non-transitory recording medium storing a computer readable program reflecting one aspect of the present invention, read printed-material image information obtained by reading a printed material is compared with suitable printed-material image information (original image data or a result of reading of a suitable printed material) obtained in a state where image formation has been appropriately performed on the printed material, the portion equivalent to the difference between the two sets of information is extracted as feature information, a readable mark is additionally printed near the location of the feature information in the printed material, and code information is additionally printed in a position on the printed material, the code information including first information and second information, the first information indicating the positional relationship between the mark and the feature information, the second information indicating a method of extracting the feature information and a feature quantity to be extracted from the feature information.

(2) In the above Item. 1, the mark is preferably printed in a position including the location of the feature information.

(3) In the above Items. 1 and 2, the mark is preferably printed on the printed material in a state from which the printed material can be visually determined to be valid.

(4) In the above Items. 1 to 3, when the difference is beyond an allowable range, the mark is preferably printed in a state from which the printed material can be visually determined to be invalid, and the code information preferably includes third information indicating that the printed material is invalid.

(5) In the above Items. 1 to 4, the method of extracting the feature information preferably includes at least one of a closed-region extraction technique for extracting a closed-region area, an end-point extraction technique for extracting an end point, an edge extraction technique for extracting an edge strength or an edge form, and a texture information extraction technique for extracting a region texture strength.

(6) in the above Items. 1 to 5, the mark is preferably printed on the printed material in a state visibly varying depending on whether the printed material is valid.

(7) in the above Items. 1 to 6, the mark and the code information additionally printed on the printed material are preferably detected, and, when at least one of the mark and the code information is not detected, additional processing is preferably performed to invalidate the printed material.

(8) To achieve the abovementioned object, according to an aspect, in a printed material processing device processing the printed material obtained by the printed material processing device of Item. 1, and a non-transitory recording medium storing a computer readable program reflecting one aspect of the present invention, the feature information in the printed material is identified by referring to the positional relationship included in the first information in the code information, the feature quantity of the feature information in the printed material is extracted by referring to the extraction method included in the second information in the code information; and a check is made to determine whether the printed material is valid, by comparing the feature quantity extracted from the feature information in the printed material with the feature quantity included in the second information.

(9) In the above Item. 8, the feature quantity extracted from the feature information in the printed material is preferably compared with the feature quantity included in the second information, when the feature quantities are the same, the printed material is preferably determined to be valid, and when the feature quantities are not the same, the printed material is preferably determined to be invalid.

(10) In the above Items 8 and 9, the code information further preferably includes third information indicating that the printed material is invalid, and the printed material is preferably determined to be invalid from the third information in the code information.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 5A through 5D are diagrams showing printed materials according to the embodiment of the present invention;

DESCRIPTION OF THE PREFERRED EMBODIMENTS

Hereinafter, an embodiment of a printed material processing method and a printed material processing device which can determine whether a printed material is valid, without the need of strict print defect determination and a certain communication environment such as a verification information server, of the present invention will be described with reference to the drawings. However, the scope of the invention is not limited to the illustrated examples.

[Structure (1) of a Printed Material Processing Device]

Figure 1:
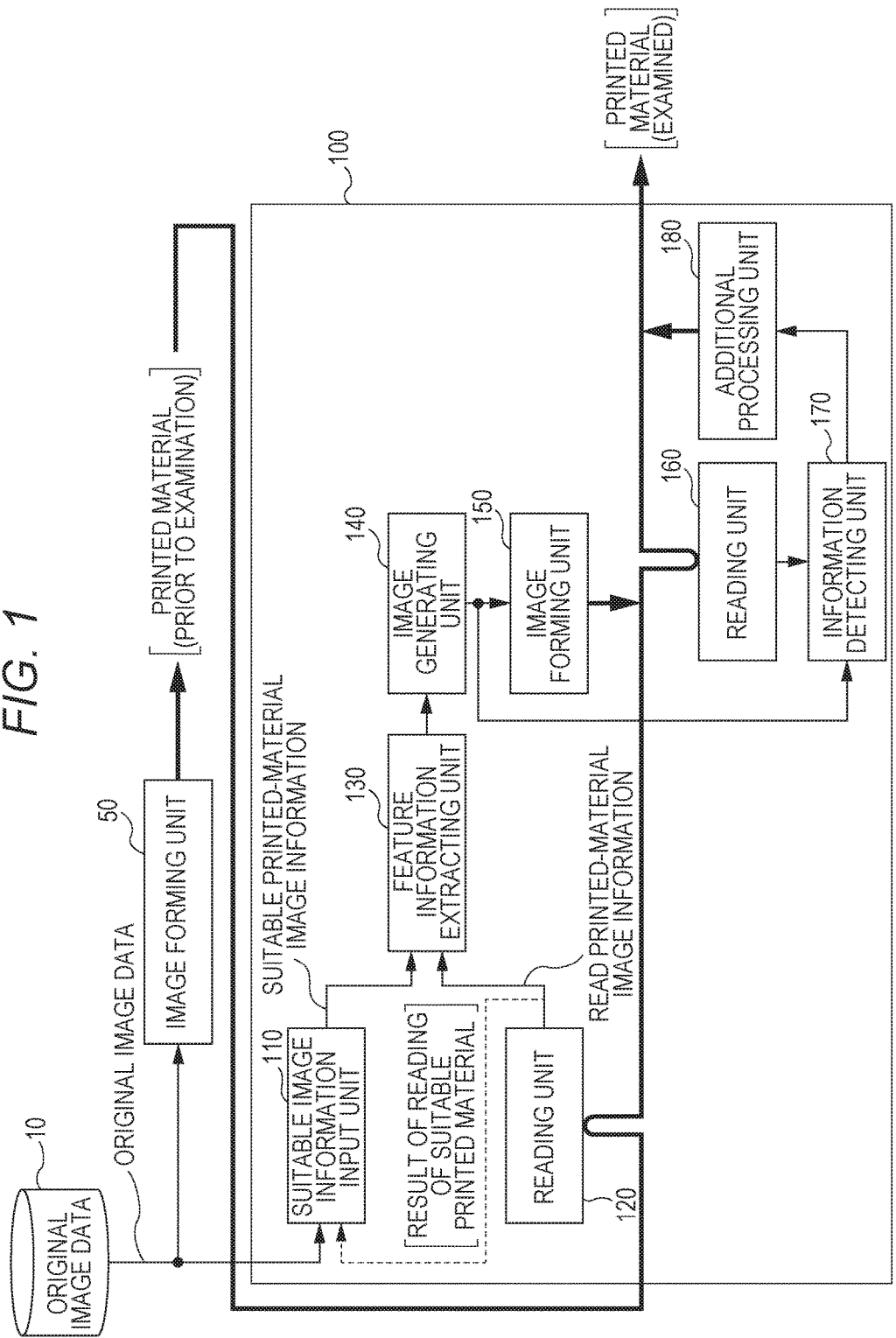
FIG. 1 is a diagram showing a structure according to an embodiment of the present invention.

Referring now to FIG. 1, the structure of a printed material processing device 100 that inspects (examines) printed materials and buries the inspection results in the printed materials is described. FIG. 1 shows a storage unit 10, an image forming unit 50, and the structure of a printed material processing device 100.

The storage unit 10 is formed with a storage medium of any kind, and stores image data in various formats for creating printed materials. The image data stored in the storage unit 10 is called original image data. The image data in various formats may be any data from which printed materials can be produced through image formation, such as image data subjected to RIP, JPG image data, PDF image data, and bitmap image data.

The image forming unit 50 is a device that produces printed material by performing image formation using the original image data according to an electrophotographic method or some other appropriate method. Although the image forming unit 50 and the printed material processing device 100 are separated from each other in FIG. 1, a single image forming unit can serve as the image forming unit 50 and the image forming unit in the printed material processing device 100.

The printed material processing device 100 does not need to make strict print defect determination, does not require a certain communication environment such as a verification information server, and produces printed materials from which printed material validity determination can be made.

The printed material processing device 100 includes a suitable image information input unit 110, a reading unit 120, a feature information extracting unit 130, an image generating unit 140, an image forming unit 150, a reading unit 160, an information detecting unit 170, and an additional processing unit 180.

The printed material processing device 100 may also include a control unit and an operation display unit (both not shown in the drawing). Further, printed materials are circulated so that a single image forming unit can serve as the image forming unit 50 and the image forming unit 150. Likewise, printed materials are circulated so that a single reading unit can serve as the reading unit 120 and the reading unit 160.

Normally, the image forming unit 50 is installed in a printing office or the like where printed materials are produced. Like the image forming unit 50, the printed material processing device 100 may be installed in a printing office or the like. Alternatively, the printed material processing device 100 may be installed in a printed material distribution office to determine validity of each printed material before distribution.

In this embodiment, either suitable printed-material image information obtained by the reading unit 120 reading a printed material is suitable printed material) that is generated by the image forming unit 50 and is in the right condition without any image defect, or the original image data stored in the storage unit 10 is input as suitable printed material image information to the suitable image information input unit 110.

FIG. 5A shows an example of suitable printed-material image information in a printed material called "Nationwide ABC Voucher".

The reading unit 120 is a scanner that generates read printed-material image information by reading the above described suitable printed material, or reading a printed material that is to be subjected to validity determination but is yet to be examined. In a case where a single image forming unit serves as the image forming unit 50 and the image forming unit 150, the reading unit 120 may be located on the downstream side of the image forming unit 50 in the sheet conveyance direction.

Receiving the suitable printed-material image information from the suitable image information input unit 110 and the read printed-material image information from the reading unit 120, the feature information extracting unit 130 compares the read printed-material image information with the suitable printed-material image information, and extracts feature information that is equivalent to the difference between the two sets of information. If two or more pieces of information are equivalent to the difference between the read printed-material image information and the suitable printed-material image information, the feature information extracting unit 130 extracts at least one large piece of the information as the feature information.

FIG. 5B shows an example of read suitable printed-material image information in a printed material called "Nationwide ABC Voucher" prior to examination. Smudge (indicated by ER1 in FIG. 5B) adheres to a lower-left portion of the printed material. The feature information extracting unit 130 compares the suitable printed-material image information in FIG. 5A with the read printed-material image information in FIG. 5B, and extracts the smudge ER1 in FIG. 5B as the feature information.

The feature information is equivalent to the difference between the read printed-material image information and the suitable printed-material image information. The feature information may not indicate smudge adhering to an image, but may indicate a missing part of an image, blurring of a part of a character, variation in the density of the frame of an image or a character, variation in the length or the thickness of the frame of an image or a character, or the like. Any difference other than the above between the read printed-material image information and the suitable printed-material image information may also be the feature information.

The feature information extracting unit 130 determines whether the printed material is non-defective (valid) and whether the printed material is defective (invalid), from the magnitude of the extracted feature quantity, the position of the extracted feature quantity, the properties (the color or the density) of the extracted feature quantity, the shape of the extracted feature quantity, influence of the extracted feature quantity on the suitable printed-material image information (a missing character or a missing image), and the like.

For example, if the smudge is smaller than a predetermined area in the blank as in FIG. 5B, and does not affect any other images and characters, the printed material is determined to be non-defective. If there is an image defect that affects (erases) another image or character as indicated by ER2 and ER3 in FIG. 5D, or if there is larger smudge than a certain area in the blank as indicated by ER4 in FIG. 5D, the printed material is determined to be defective.

In the feature information extracting unit 130, the method of extracting the above described feature quantity preferably involves at least one of the following techniques: a closed-region extraction technique for extracting a closed-region area, an end-point extraction technique for extracting an end point, an edge extraction technique for extracting an edge strength or an edge form, and a texture information extraction technique for extracting a region texture strength.

The image forming unit 140 described below is notified of the extraction method used in extracting the feature information at the feature information extracting unit 130, and the extracted feature quantity.

The image generating unit 140 generates images of the mark and the code information to be additionally printed on the printed material. The mark is an image of a predetermined shape to be printed in the vicinity of the location of the feature information on the printed material. The image of the "INSPECTED" seal indicated by MK1 in FIG. 5C is an example of the mark. The mark is preferably distinguishable from the characters printed on the printed material, and may indicate "INSPECTED (NON-DEFECTIVE)", "INSPECTED (DEFECTIVE)", "INSPECTED (VALID)", "INSPECTED (INVALID)", "INSPECTED (PASSED)", "INSPECTED (NOT PASSED)", or the like. Alternatively, the mark may be one symbol, such a circle or a cross.

This mark is preferably printed on the printed material in a state that visibly varies depending on whether the printed material is valid. For example, color, density, transmissivity, glossiness are changed. If the printed material is non-defective, the mark has a low density or a low glossiness. If the printed material is defective, the mark has a high density and is in a non-transmissive state. The visible state of the mark is preferably varied in this manner.

The code information is an image indicating information that is formed with characters, numerals, or a bar code, and is to be additionally printed in a position on the printed material. The code information is designed to include first information and second information, or include first information, second information, and third information.

In this example, the first information is the positional information indicating the position of the mark relative to the feature information, and the second information indicates the method to be used in extracting the feature information and the feature quantity to be extracted from the feature information (or the feature quantity at the time of examination).

The numerical image "141421356" indicated by C1 in FIG. 5C, and the numerical image "987654321999" indicated by C1' in FIG. 5D are examples of the code information. Including third information in addition to first information and second information, the code information C1' has a larger number of digits than the code information C1 formed only with first information and second information. Other than numerals, a bar code may be used as the code information.

The code information is formed with first information and second information, the first information indicating the positional relationship between the reference point of the mark and the feature information, the second information indicating the method to be used in extracting the feature information and the feature quantity to be extracted from the feature information.

If the difference is beyond the allowable range, and the printed material is determined to be defective by the feature information extracting unit 130, the image generating unit 140 generates an image (the cross mark MK2 in FIG. 5D) from which the invalidity of the printed material can be visually recognized, and generates an image indicating code information including third information indicating that the printed material is invalid.

The image forming unit 150 performs additional printing on the printed material by forming the images of the mark and the code information generated by the image generating unit 140. In a case where the printed material is valid, the mark to be additionally printed is preferably in such a pale color that the printed material can be seen through the mark. In a case where the printed material is invalid, the mark to be additionally printed is preferably a clearly recognizable one, regardless of whether the printed material under the mark is visible. The code information to be additionally printed is preferably printed clearly in a predetermined position, such as a particular position like the printed material inspection column shown in FIGS. 5A through 5D.

The reading unit 160 performs reading to determine whether the mark and the code information have been additionally printed on the printed material by the image forming unit 150.

From a result of the reading performed by the reading unit 160, the information detecting unit 170 determines whether the mark and the code information have been additionally printed on the printed material by the image forming unit 150.

If neither a mark nor code information has been additionally printed on the printed material by the image forming unit 150, the additional processing unit 180 performs additional processing to put the printed material into an unusable state. The additional processing may be hiding of the printed material with a particular color, shredding of the printing material, or the like.

[Structure (2) of a Printed Material Processing Device]

Figure 2:
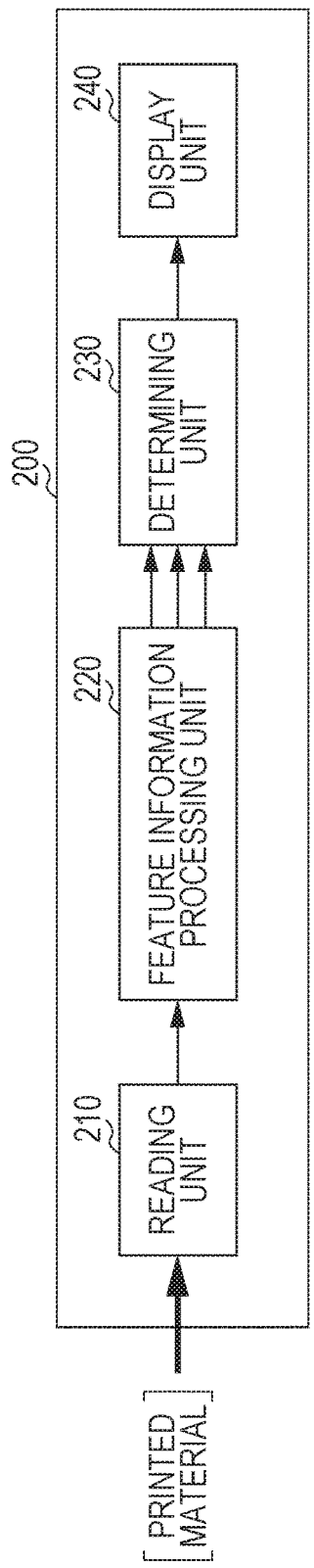
FIG. 2 is a diagram showing another structure according to the embodiment of the present invention.

FIG. 2 shows the structure of a printed material processing device 200 that re-inspects a printed material (an examined printed material) having inspection results (examination results) buried therein, and determines whether the printed material is valid. The structure of the printed material processing device 200 is described below.

The printed material processing device 200 includes a reading unit 210, a feature information processing unit 220, a determining unit 230, and a display unit 240. The printed material processing device 200 may also include a control unit and an operation display unit (both not shown in the drawing).

It should be noted that the printed material processing device 200 does not need to be connected to a verification information server or the like, because the printed material processing device 200 determines whether a printed material is valid only from the information buried in the printed material. That is, the printed material processing device 200 does not require a communication environment such as a verification information server, but is capable of determining whether a printed material is valid.

To determine whether printed materials distributed after examination are valid, the printed material processing device 200 is preferably installed in respective places where the printed materials are to be used (such as shops, the entrances and the exits of various exhibition sites, and the gateways for vehicles). The printed material processing device 200 can also be used at home by the purchaser of a printed material, to determine whether the printed material after examination is valid prior to use.

The reading unit 210 is a scanner that generates read printed-material image information by reading a printed material that is to be subjected to validity determination.

Receiving the read printed-material image information from the reading unit 210, the feature information processing unit 220 extracts feature information, a mark, and code information. The feature information processing unit 220 then extracts the first information and the second information included in the code information, or extracts the first information, the second information, and the third information included in the code information. The feature information processing unit 220 further identifies the feature information in the printed material by referring to the positional relationship included in the first information in the code information, and extracts the feature quantity of the feature information included in the printed material by referring to the extraction method included in the second information in the code information.

The feature information processing unit 220 also transfers information indicating existence/nonexistence of a mark, information indicating existence/nonexistence of code information, the feature quantity extracted from the feature information in the printed material, and the feature quantity included in the second information, to the determining unit 230.

By referring to the information indicating existence/nonexistence of a mark, the feature quantity extracted from the feature information in the printed material, and the feature quantity included in the second information, the determining unit 230 compares the feature quantity extracted from the feature information in the printed material with the feature quantity included in the second information. If the two feature quantities are the same, the determining unit 230 determines the printed material to be valid. If the feature quantity extracted from the feature information in the printed material does not match the feature quantity included in the second information, the determining unit 230 determines the printed material to be invalid. The display unit 240 displays a result (valid or invalid) of the determination performed by the determining unit 230.

The printed material processing device 200 may be formed with a scanner and a computer, but may be formed with a handy scanner that includes the feature information processing unit 220, the determining unit 230, and the display unit 240.

[Operation (1) of a Printed Material Processing Device]

Figure 3:
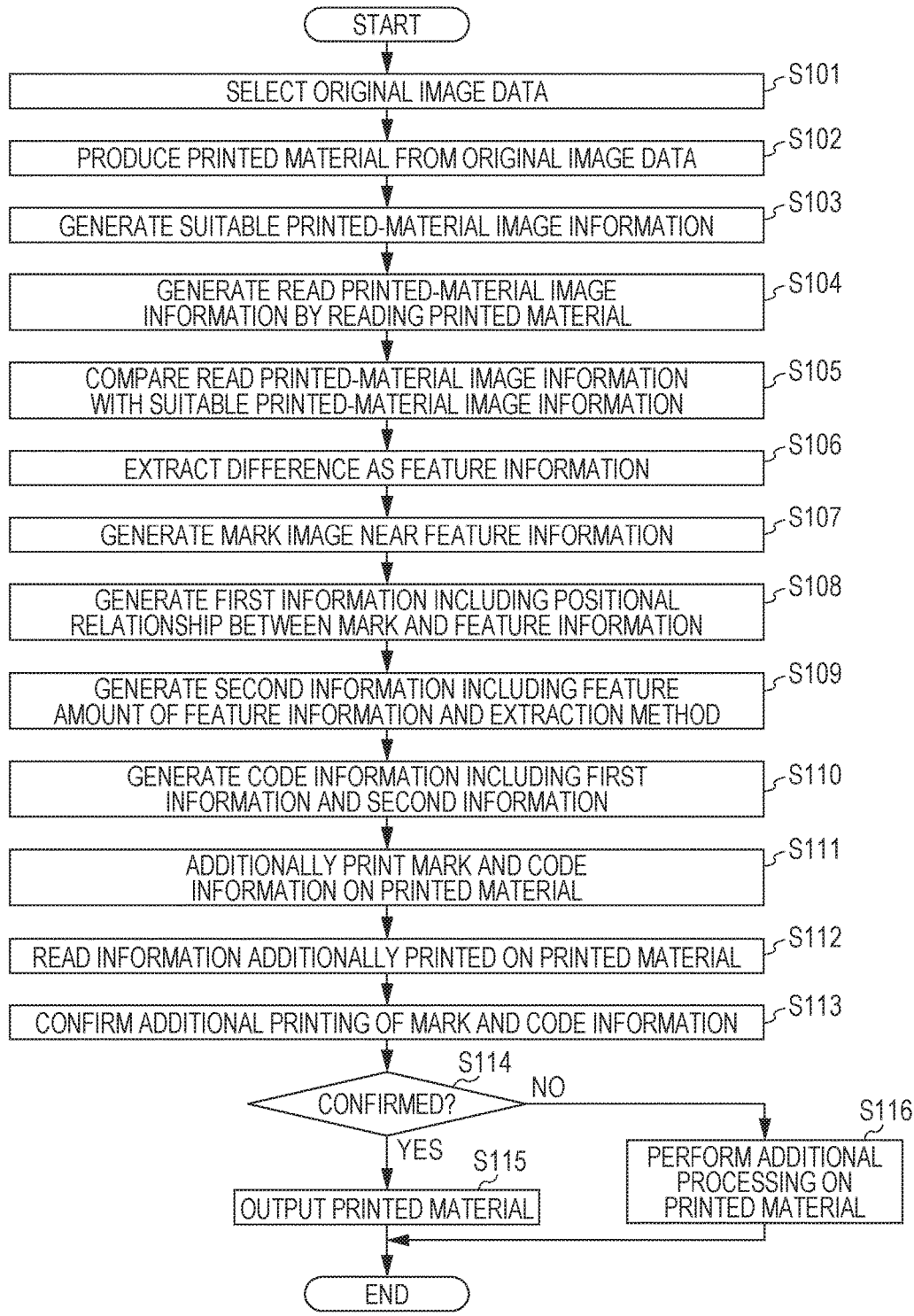
FIG. 3 is a flowchart showing an operation according to the embodiment of the present invention.

Referring now to the flowchart shown in FIG. 3, the steps in a process to be performed by the printed material processing device 100 to inspect (examine) a printed material and buries the inspection results in the printed material are described.

Original image data stored in the storage unit 10 is designated (step S101 in FIG. 3), and a printed material is produced by the image forming unit 50 performing image formation in accordance with the original image data (step S102 in FIG. 3).

Either suitable printed-material image information obtained by the reading unit 120 reading a printed material (a suitable printed material) that has been generated by the image forming unit 50 and been determined to be in the right condition without any image defect by an operator, or the original image data stored in the storage unit 10 is input to the suitable image information input unit 110, which then generates suitable printed-material image information (step S103 in FIG. 3).

The printed material produced by the image forming unit 50 is read by the reading unit 120 for examination, and read printed-material image information is generated (step S104 in FIG. 3).

Receiving the suitable printed-material image information from the suitable image information input unit 110 and the read printed-material image information from the reading unit 120, the feature information extracting unit 130 compares the read printed-material image information with the suitable printed-material image information (step S105 in FIG. 3).

The above comparison between the read printed-material image information and the suitable printed-material image information (step S105 in FIG. 3) is not necessarily conducted by a particular method. For example, a known image analysis method may be used in comparing the read printed-material image information with the suitable printed-material image information.

Figure 11:
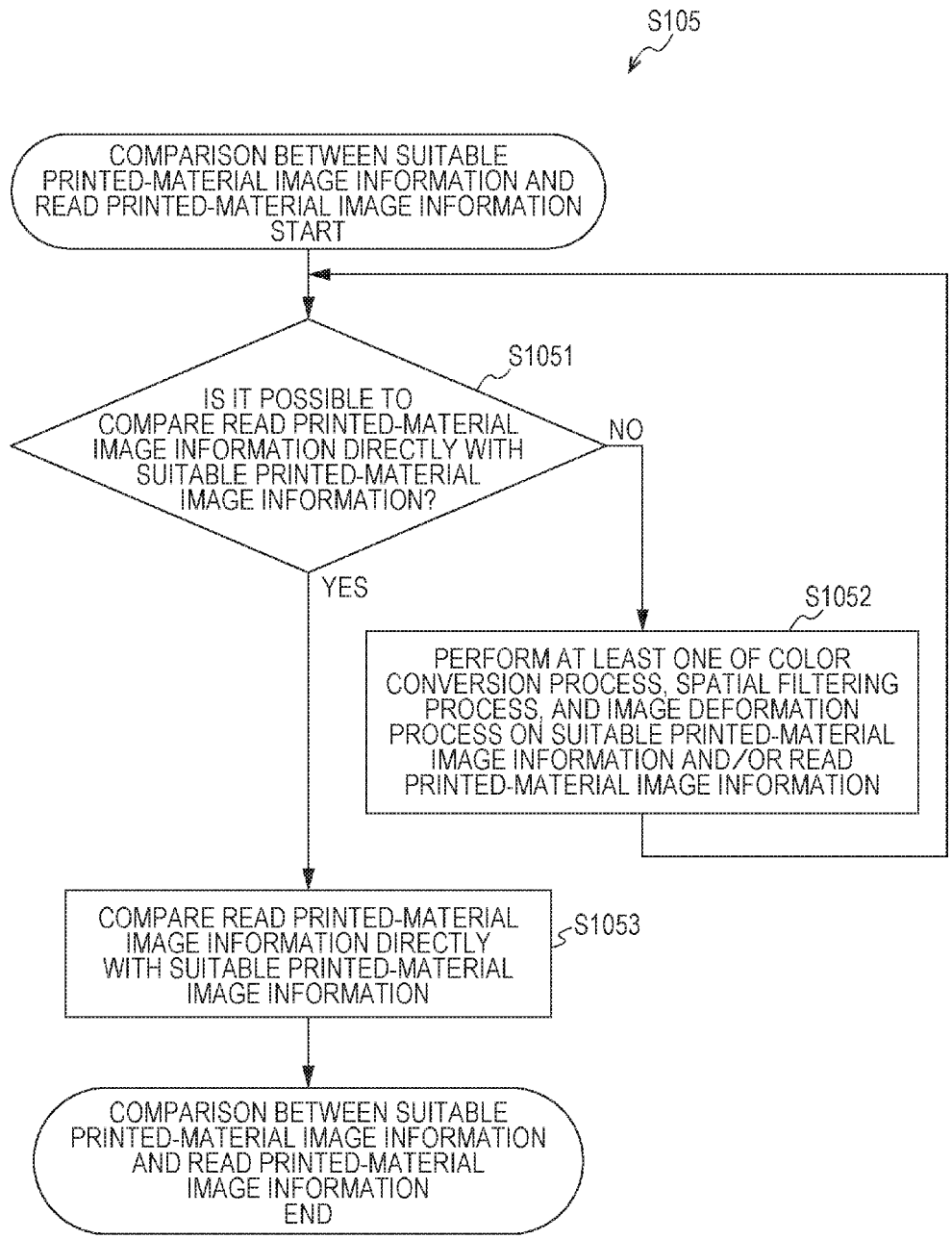
FIG. 11 is a flowchart showing an operation according to the embodiment of the present invention.

Since the read printed-material image information and the suitable printed-material image information differ in characteristics, any difference might not be obtained simply by comparing the two sets of information directly with each other (NO in step S1051 in FIG. 11).

In such a case, at least one of the two sets of information, the read printed-material image information and the suitable printed-material image information, is subjected to at least one of the following processes: a color conversion process for adjusting gradation characteristics to certain characteristics, a spatial filtering process for adjusting spatial frequency characteristics to certain characteristics, and an image deformation process for adjusting the positional relationship with respect to image features to certain characteristics (step S1052 in FIG. 11).

After the characteristics of the two sets of image information are adjusted so that the two sets of image information can be compared directly with each other (YES in step S1051 in FIG. 11), the comparison is performed (step S1053 in FIG. 11). The process then returns to the flowchart in FIG. 3, and the steps that follow are carried out.

The feature information extracting unit 130 extracts feature information equivalent to the difference between the suitable printed-material image information and the read printed-material image information (step S106 in FIG. 3). For example, ER1 in FIG. 5B or any of ER2 through ER4 in FIG. 5D may be the feature information. If two or more pieces of information are equivalent to the difference between the read printed-material image information and the suitable printed-material image information, the feature information extracting unit 130 should extract at least one large piece of the information as the feature information. The feature information extracting unit 130 compares the suitable printed-material image information in FIG. 5A with the read printed-material image information in FIG. 5B, and extracts the smudge ER1 in FIG. 5B as the feature information, for example.

In the vicinity of the location of the feature information, the image generating unit 140 generates an image of a mark to be additionally printed (step S107 in FIG. 3).

If the feature information extracting unit 130 determines the printed material to be non-defective, the image generating unit 140 generates an image of a mark indicating that the printed material is non-defective (see MK1 in FIG. 5C). If the feature information extracting unit 130 determines the printed material to be defective, on the other hand, the image generating unit 140 generates an image of a mark from which the printed material can be visibly determined to be defective (see MK2 in FIG. 5D).

The image generating unit 140 also generates first information indicating the positional relationship between the above mark and the feature information having the mark added in the vicinity thereof (step S108 in FIG. 3).

Here, the mark is an image indicating that the printed material has been inspected. Although the color tone of the mark is not specifically designated, the mark is preferably in such a color that the printed material can be clearly seen, or preferably has a low coverage so that the printed material can be clearly seen. Alternatively, the mark is preferably additionally printed to hide a defect.

Figure 6:
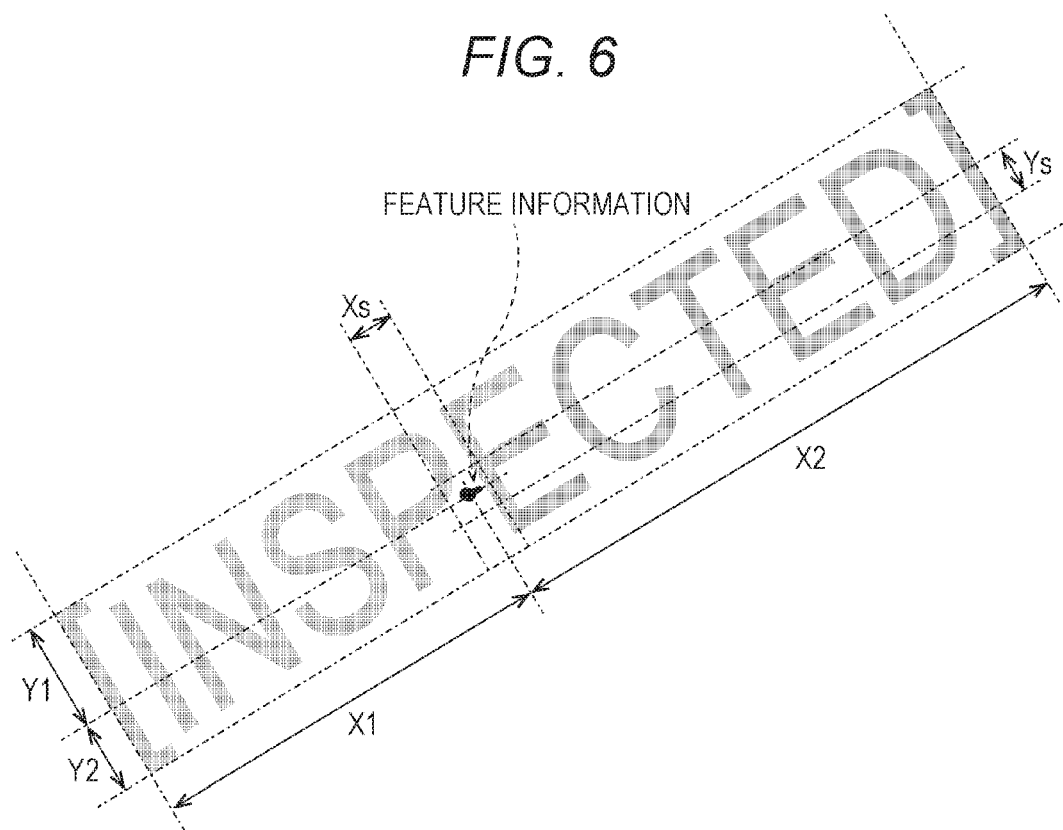
FIG. 6 is a diagram showing a printed material according to the embodiment of the present invention.

Referring now to FIG. 6, feature information, a mark additionally printed in the vicinity of the location of the feature information, and positional information included in first information are described.

As shown in FIG. 6, a mark indicating that the printed material has been inspected (valid/non-defective) is additionally printed in a position that includes the location of the feature information. The mark "INSPECTED" preferably has position indices with which the position coordinates can be referred to, so that the position of the mark relative to the feature information can be identified.

In FIG. 6, two brackets are provided at the start and the end of the mark "INSPECTED", and edges of these brackets are used as the indices.

For example, the relative coordinates of the feature information are (Xadr, Yadr). As for X and Y, the horizontal direction in the mark is the X-direction, and the vertical direction in the mark is the Y-direction. A relative address is set in terms of the X-direction and the Y-direction. Because of this, any change will not be caused in X and Y even if the mark rotates on the printed material.

In this example, (Xadr, Yadr) represents the relative address of the feature information in the mark, X1 represents the distance in the X-direction from the left edge of the opening bracket to the feature information, X2 represents the distance in the X-direction from the feature information to the right edge of the closing bracket, Y1 represents the distance in the Y-direction from the upper edge of the opening bracket to the feature information, Y2 represents the distance in the Y-direction from the feature information to the bottom edge of the closing bracket, Xs represents the size of the feature information in the X-direction, and Ys represents the size of the feature information in the Y-direction.

The position (X1, Y1) of the feature information can be identified as: Xadr=X1/(X1+X2), Yadr=Y1/(Y1+Y2). In this case, Xadr and Yadr are included as the first information in code information.

The amount of the information Xadr, Yadr) should be three to eight bits, though it depends on the accuracy required in the position identification. If the amount of information is eight bits, for example, the position can be identified with an accuracy of $1/256$ of the distance between the start and the end of the mark. It is also possible to add a sign bit so as to enable designation outside the region in the mark. If the amount of information is extended to nine bits in the above example, the region in the mark can be expanded in terms of relative coordinates in the X- and Y-directions by the amount equivalent to the size of the mark in total. As shown in FIG. 6, it is possible to further set the region sizes Xs and Ys of the feature information. If Xs is 16 in a case where Xadr is set with an 8-bit accuracy, the size of the mark in the X-direction, which is $16/256=1/16$, can be extracted as the feature region.

The image generating unit 140 converts the feature information extraction method sent as a notification from the feature information extracting unit 130, and the feature quantity at the time of examination extracted from the feature quantity by the feature information extracting unit 130, into characters or numerals. By doing so, the image generating unit 140 generates second information (step S109 in FIG. 3).

From the first information and the second information, the image generating unit 140 then generates code information formed with a series of characters or numerals (step S110 in FIG. 3).

If the printed material is determined to be non-defective by the feature information extracting unit 130, the image generating unit 140 generates code information formed with a series of characters or numerals from the first information and the second information (step S110 in FIG. 3). If the printed material is determined to be defective by the feature information extracting unit 130, the image generating unit 140 generates third information indicating that the printed material is invalid, in addition to the first information and the second information. From the first information, the second information, and the third information, the image generating unit 140 generates code information formed with a series of characters or numerals (step S110 in FIG. 3).

The image forming unit 150 performs additional printing on the printed material by forming the images of the mark and the code information generated by the image generating unit 140 (step S111 in FIG. 3).

Immediately after the additional printing is performed by the image forming unit 150, the reading unit 160 performs reading to determine whether the mark and the code information have been additionally printed on the printed material by the image forming unit 150 (step S112 in FIG. 3).

The information detecting unit 170 compares a result of the reading performed by the reading unit 160 with the additional print image data generated by the image forming unit 140. By doing so, the information detecting unit 170 determines whether the mark and the code information have been additionally printed on the printed material by the image forming unit 150 (step S113 in FIG. 3).

If the information detecting unit 170 confirms that the additional printing has been performed by the image forming unit 150 (YES in step S114 in FIG. 3), the printed material is output as an examined printed material from the printed material processing device 100 (step S115 in FIG. 3).

If the information detecting unit 170 does not confirm that the additional printing has been performed by the image forming unit 150 (NO in step S114 in FIG. 3), the additional processing unit 180 performs additional processing so as to put the printed material into an unusable state (step S116 in FIG. 3). The additional processing to be performed by the additional processing unit 180 may be hiding of the printed material with a particular color, shredding of the printing material, or the like.

Figure 7:
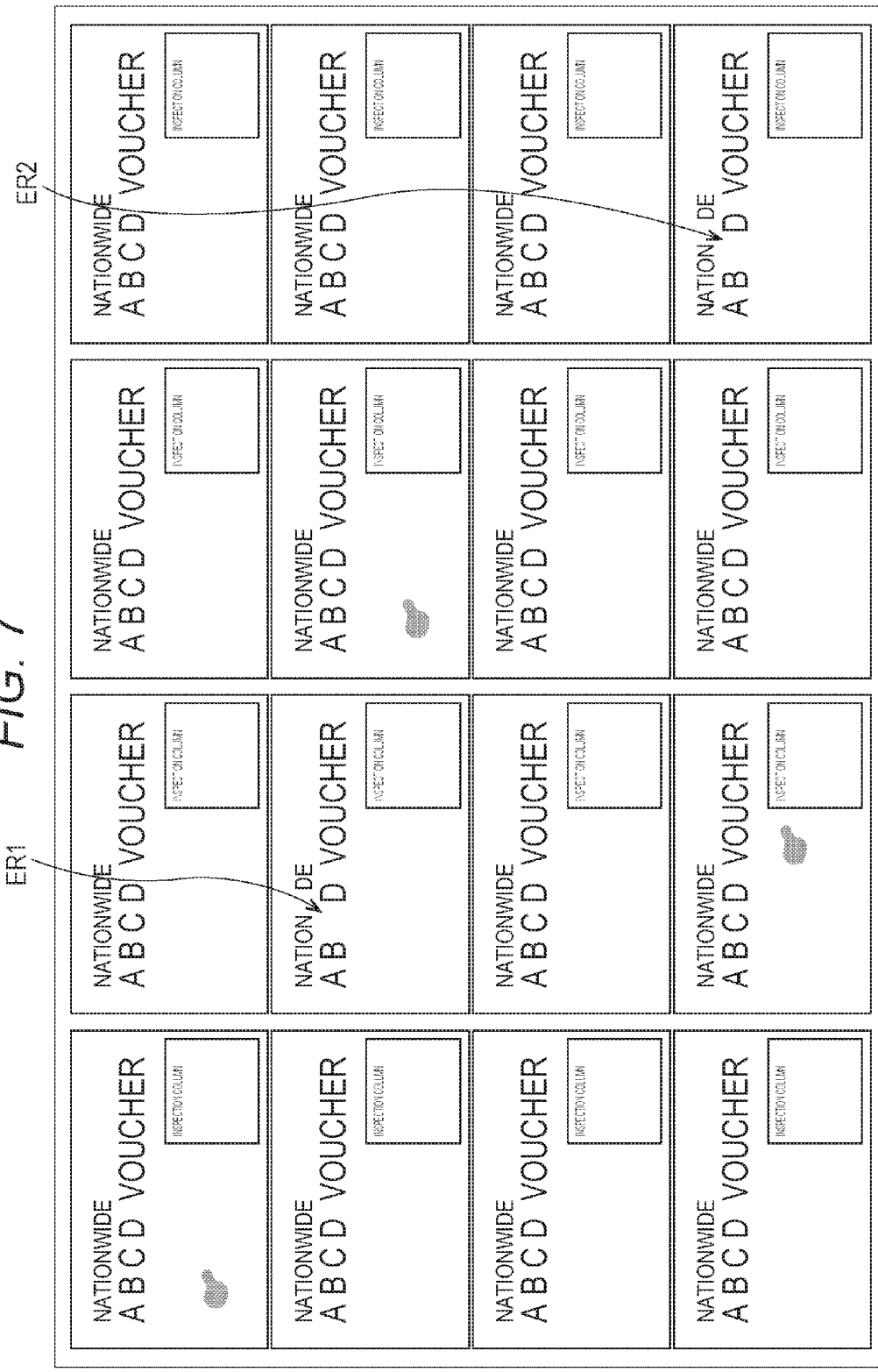
FIG. 7 is a diagram showing printed materials according to the embodiment of the present invention.

Referring now to FIG. 7 and the drawings that follow, the above described processing on printed materials is described in detail. In FIGS. 5A through 5D, one voucher ("Nationwide ABC Voucher") before and after examination is shown as a printed material. In reality, however, vouchers printed on one sheet are output as shown in FIG. 7. In a case where vouchers are printed on one paper sheet in this manner, examination is conducted on the vouchers one by one.

FIG. 7 shows printed materials that have been output from the image forming unit 50 but are yet to be examined. In the vouchers shown in FIG. 7, there exist image defects ER1 and ER2 that are missing characters outside the allowable region, as well as image defects caused by smudge outside the allowable region.

Figure 8:
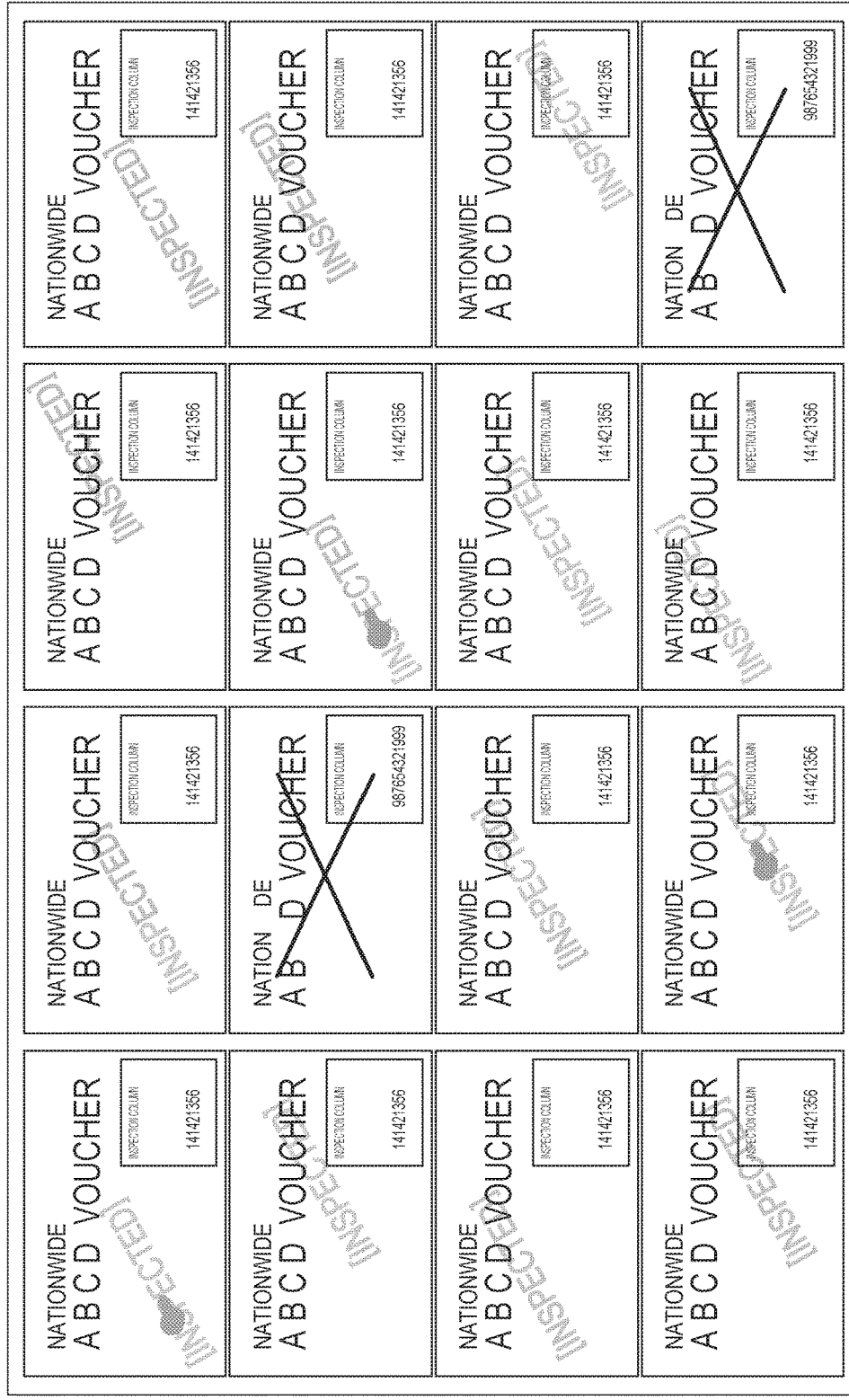
FIG. 8 is a diagram showing printed materials according to the embodiment of the present invention.

FIG. 8 shows the printed materials that have been output from the printed material processing device 100 and been examined. The mark "INSPECTED" and the code information including the first information and the second information have been additionally printed on each of the vouchers that do not have the defects ER1 and ER2. Meanwhile, a large cross mark and the code information including the first information, the second information, and the third information have been additionally printed on each of the vouchers that have the defects ER1 and ER2.

The mark "INSPECTED" is additionally printed in the vicinity of the most characteristic portion of each of the vouchers printed on one sheet. Therefore, the position of the additionally-printed mark varies among the printing surfaces of the respective printed materials.

Figure 9:
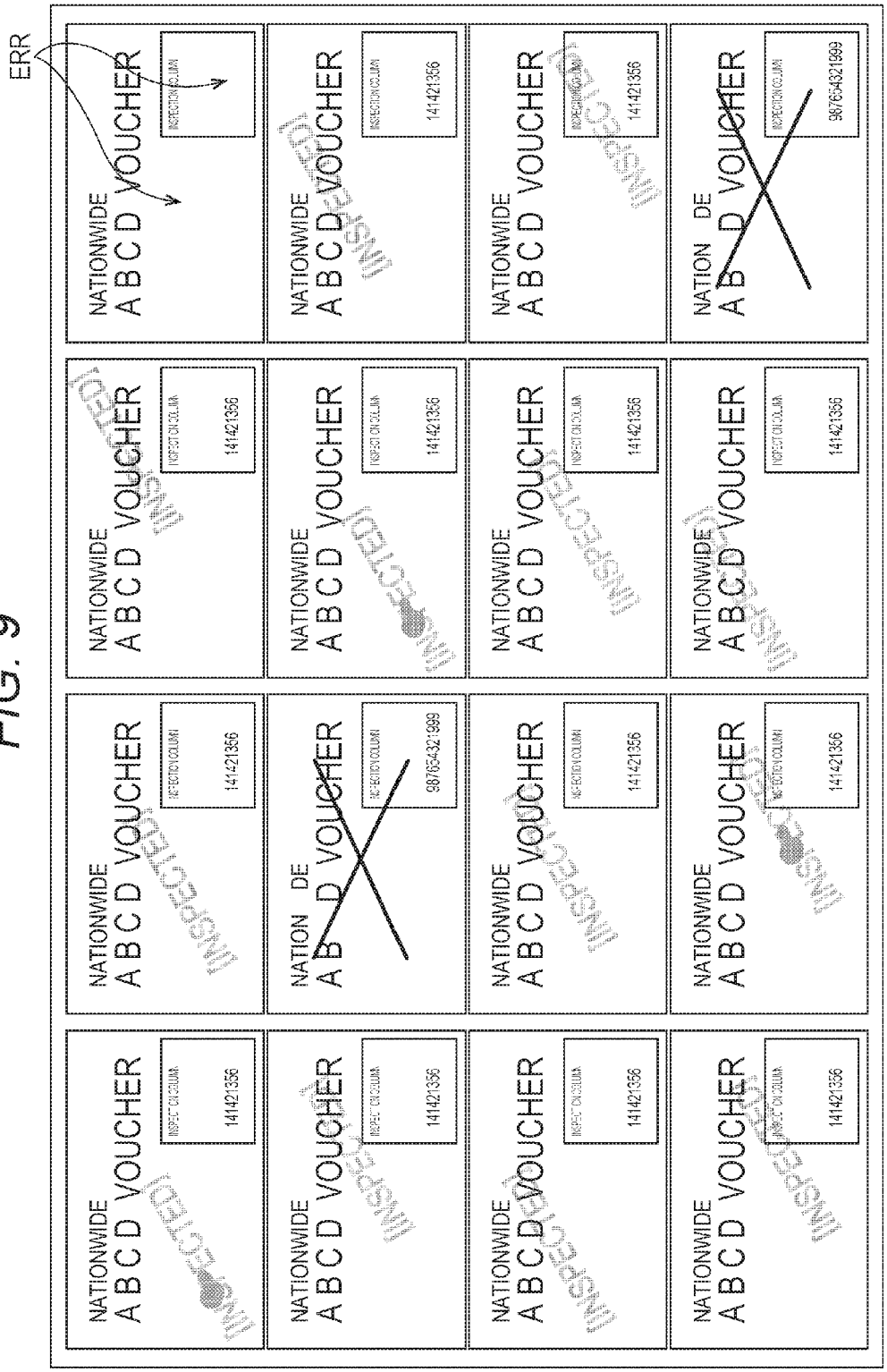
FIG. 9 is a diagram showing printed materials according to the embodiment of the present invention.
Figure 10:
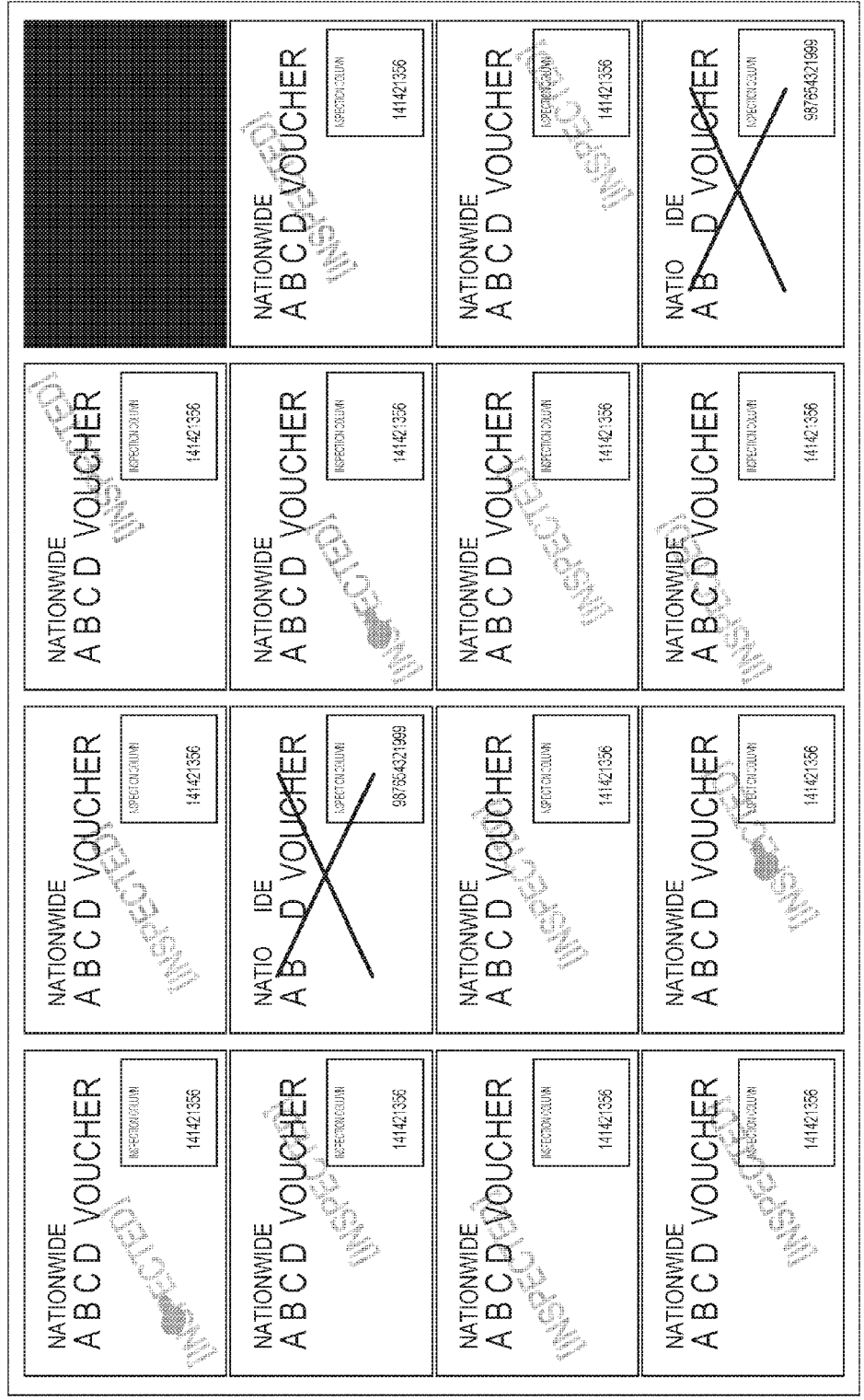
FIG. 10 is a diagram showing printed materials according to the embodiment of the present invention.

FIG. 9 shows the printed materials that have been subjected to the additional printing at the image forming unit 150 in the printed material processing device 100, and are being read by the reading unit 160 during examination.

The mark "INSPECTED" and the code information including the first information, and the second information have been additionally printed on each of the vouchers that do not have the defects ER1 and ER2 shown in FIG. 7. Meanwhile, a large cross mark and the code information including the first information, the second information, and the third information have been additionally printed on each of the vouchers that have the defects ER1 and ER2.

At the upper right corner in FIG. 9, however, the mark "INSPECT" and the code information are missing, and an additional print error ERR is detected by the information detecting unit 170. As a result, hiding with a particular color is performed as the additional processing on the upper right corner by the additional processing unit 180, to put the corresponding voucher into an unusable state. After that, the vouchers are output from the printed material processing device 100.

Although not shown in the drawings, if the additional print error ERR shown in FIG. 9 appears in more than one voucher, the additional processing unit 180 may perform processing, such as hiding of the entire sheet with a particular color or shredding of the entire sheet, in accordance with a decision made by the information detecting unit 170.

[Operation (2) of a Printed Material Processing Device]

Figure 4:
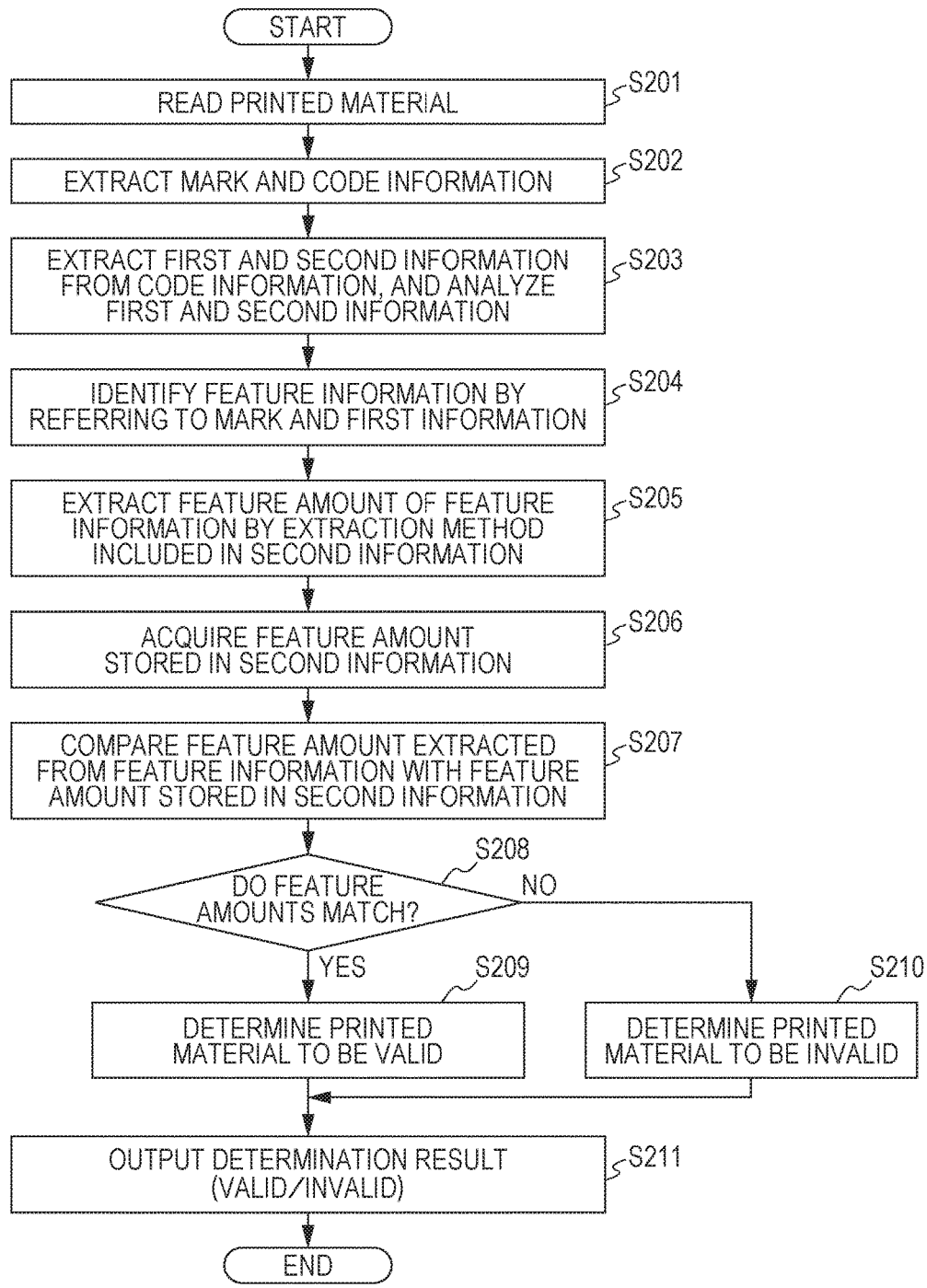
FIG. 4 is a flowchart showing another operation according to the embodiment of the present invention.

Referring now to the flowchart in FIG. 4, the steps in a process to be performed by the printed material processing device 200 are described. In this process, the printed material processing device 200 determines validity of a printed material in which a result of printed material inspection (examination) has been buried by the printed material processing device 100.

To determine whether printed materials distributed after examination are valid, the printed material processing device 200 performs the printed material processing described below in respective places where the printed materials are to be used (such as shops, the entrances and the exits of various exhibition sites, the gateways for vehicles, and the homes of the purchasers of the printed materials).

The reading unit 210, which is a scanner or the like, reads a printed material to be subjected to validity determination, and then generates read printed-material image information (step S201 in FIG. 4). The feature information processing unit 220 is then notified of the read printed-material image information.

Receiving the read printed-material image information from the reading unit 210, the feature information processing unit 220 extracts a mark and code information from the read printed-material image information (step S202 in FIG. 4).

The feature information processing unit 220 then separately extracts and analyzes the first information and the second information included in the code information, or the first information, the second information, and the third information included in the code information (step S203 in FIG. 4) in this step, the feature information processing unit 220 extracts the first information including positional information, and the second information including the method to be used in extracting the feature information and the feature quantity at the time of examination, from the code information formed with characters or numerals according to a predetermined algorithm. If the code information includes the third information, the feature information processing unit 220 extracts and analyzes the third information in the same manner as above.

By referring to the positional relationship (the relationship indicating the position of the mark relative to the feature information) included in the first information in the code information, the feature information processing unit 220 identifies the feature information in the printed material in accordance with the mark (step S204 in FIG. 4). That is, the feature information processing unit 220 identifies the feature information from the coordinates of the mark relative to a certain position. The relative coordinates are included the first information.

The feature information processing unit 220 also extracts the current feature quantity of the feature information in the printed material by referring to the extraction method included in the second information in the code information (step S205 in FIG. 4), and transfers the extracted feature quantity to the determining unit 230. The feature information processing unit 220 further obtains the feature quantity at the time of examination stored in the second information (step S206 in FIG. 4), and transfers the obtained feature quantity to the determining unit 230. The feature information processing unit 220 also transfers information indicating existence/nonexistence of a mark and existence/nonexistence of code information in the printed material read by the reading unit 210, to the determining unit 230.

The determining unit 230 compares the feature quantity extracted from the feature information in the printed material with the feature quantity included in the second information (step S207 in FIG. 4). If the feature quantity extracted from the feature information in the printed material matches the feature quantity stored in the second information (YES in step S208 in FIG. 4), the determining unit 230 determines the printed material to be valid (step S209 in FIG. 4).

If the feature quantity extracted from the feature information in the printed material does not match the feature quantity stored in the second information (NO in step S208 in FIG. 4), the determining unit 230 determines the printed material to be invalid (step S210 in FIG. 4). In a case where any code information is extracted or any feature information is not identified by the feature information processing unit 220, the determining unit 230 may determine the printed material to be invalid. The result of the determination performed by the determining unit 230 on validity or invalidity is displayed on the display unit 210.

Other Embodiments

The position in which the code information is to be additionally printed may be determined in advance as shown in FIGS. 5A through 5D. Alternatively, the code information may be additionally printed in the same position as the mark (or may be attached to the mark or put into a predetermined positional relationship with the mark).

The code information may be printed in more than one predetermined position, to achieve durability against defacement or the like of the printed material.

Further, the image processing for extracting a feature quantity is not limited to a particular technique, and it is possible to select and use at least one of the following known techniques: a closed-region extraction technique, an endpoint extraction technique, an edge extraction technique, a texture information extraction technique, and the like. A feature quantity to be obtained by any of these techniques may be the area, the form, or the number of extracted closed regions, the feature quantity or the number of extracted end points, the strength, the length, the form, or the number of extracted edges, texture characteristics such as the texture strength in an extracted region or the spatial frequency in the extracted region, or the like.

Further, a mark indicating that a defective printed material is invalid may be additionally printed, so that the invalidity of the printed material can be confirmed by the first through third information in the code information, and the defective portion(s) can be extracted and identified. This enables a distinction between a case where the owner of the printed material inadvertently defaced the printed material and a case where the defective printed material was acquired by the third party and a mark "INSPECTED" was forged by some method.

If a defaced portion overlaps the feature portion in a printed material, it might be difficult to detect the feature quantity of the feature portion. To counter such a situation, the characteristics of the image medium forming the feature portion, such as the color tone and spectroscopic characteristics, may be recorded in the form of a code. With such a code, the feature quantity can be more accurately detected, as the feature quantity can be calculated from colored light that is hardly affected by defacement. Thus, durability against defacement can be increased.

Effects to be Achieved by the Embodiment (1) In a printed material processing device according to the above described embodiment, and a non-transitory recording medium storing a computer readable program, a difference between read printed-material image information and suitable printed-material image information is set as feature information, a readable mark is additionally printed in the vicinity of the location of the feature information, and code information including first information (the positional relationship between the mark and the feature information) and second information (the feature information extraction method and the feature quantity to be extracted from the feature information) is additionally printed in a position on the printed material. With this structure, the feature information in the printed material can be identified from the positional relationship included in the first information in the code information, the feature quantity of the feature information in the printed material can be extracted by the extraction method included in the second information in the code information, and a check can be made to determine whether the printed material is valid by comparing the feature quantity extracted from the feature information in the printed material with the feature quantity included in the second information. In this case, there is no need to store any verification information in any verification information server at the time of formation of the printed material. Further, there is no need to communicate with any verification information server holding verification information at the time of printed material validity determination. The validity/invalidity of the printed material becomes apparent from the feature information in the printed material and the code information additionally printed on the printed material. Since a difference from the printed material in the right condition is used as the feature information at the time of formation of the printed material, print defects can be reduced.

(2) In the above structure (1), the mark is printed in a position that includes the location of the feature information. With this structure, the difference from the printed material in the right condition can be used as the feature information, and the difference for an image defect) from the printed material in the right condition can be made inconspicuous. As a result, print defects can be reduced.

(3) In either of the structures (1) and (2) the printed material visually indicates that the printed material is valid/invalid. Thus, the validity/invalidity of the printed material becomes visually apparent.

(4) In any of the structures (1) through (3), when the difference is beyond an allowable range, a mark from which the printed material can be visually determined to be invalid, and code information including third information indicating that the printed material is invalid are additionally printed, so that the invalidity of the printed material becomes visually apparent, and furthermore, can be confirmed by the code information. Thus, the code information enables determination as to whether the printed material is a defaced valid printed material and whether the printed material is an invalid printed material.

(5) In any of the structures (1) through (4), the method(s) to be used in extracting the feature quantity may be at least one of the following techniques: a closed-region extraction technique for extracting a closed-region area, an end-point extraction technique for extracting an end point, an edge extraction technique for extracting an edge strength or an edge form, and a texture information extraction technique for extracting a region texture strength. By one or more of these techniques, the feature quantity of the feature information in the printed material can be accurately extracted, and a check can be made to determine whether the printed material is valid by comparing the feature quantity extracted from the feature information in the printed material and the feature quantity included in the second information.

(6) In any of the structures (1) through (5), the mark is printed on the printed material in a state that visibly varies depending on whether the printed material is valid. Thus, the validity/invalidity of the printed material becomes visually apparent.

(7) In any of the structures (1) through (6), the mark and the code information additionally printed on the printed material are detected. If the mark and/or the code information cannot be detected, additional processing for invalidating the printed material is performed. Thus, any printed material from which validity/invalidity cannot be determined will not be distributed, and an accurate validity check can be performed on each of the distributed printed materials.

(8) In a printed material processing device according to an aspect of the present invention, and a non-transitory recording medium storing a computer readable program, a difference between read printed-material image information and suitable printed-material image information is set as feature information at the time of formation of a printed material, a readable mark is additionally printed in the vicinity of the location of the feature information, and code information including first information (the positional relationship between the mark and the feature information) and second information (the feature information extraction method and the feature quantity to be extracted from the feature information) is additionally printed in a position on the printed material. At the time of printed material validity determination, the feature information in the printed material can be identified from the positional relationship included in the first information in the code information, the feature quantity of the feature information in the printed material can be extracted by the extraction method included in the second information in the code information, and a check can be made to determine whether the printed material is valid by comparing the feature quantity extracted from the feature information in the printed material with the feature quantity included in the second information. In this case, there is no need to communicate with any verification information server holding verification information at the time of printed material validity determination. The validity/invalidity of the printed material becomes apparent from the feature information in the printed material and the code information additionally printed on the printed material. Since a difference from the printed material in the right condition is used as the feature information at the time of formation of the printed material, print defects can be reduced.

(9) in the structure (8), the feature quantity extracted from the feature information in the printed material is compared with the feature quantity included in the second information. If the feature quantities are the same, the printed material is determined to be valid. If the feature quantities are not the same, the printed material is determined to be invalid. In this manner, validity/invalidity of each printed material can be accurately determined.

(10) In either of the structures (8) and (9), the code information further includes third information indicating that the printed material is invalid, and the printed material is determined to be invalid from the third information in the code information. In this manner, the invalidity of the printed material can be confirmed by the code information. Thus, the code information enables determination as to whether the printed material is a defaced valid printed material and whether the printed material is an invalid printed material.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A printed material processing system comprising:
   a storage that stores original image data;
   a first image forming device that performs image formation based on the original image data; and
   a first printed material processing device configured to:
      compare (i) read printed-material image information obtained by reading a printed material on which image formation has been performed by the first image forming device with (ii) suitable printed-material image information obtained in a state where image formation has been appropriately performed on the printed material, and extract a portion equivalent to a difference between the two compared sets of information as feature information;
      generate an image of a mark to be additionally printed near a location of the feature information in the printed material, set first information indicating a positional relationship between the mark to be additionally printed near the location of the feature information in the printed material and the feature information, set second information indicating a method of extracting the feature information and a feature quantity to be extracted from the feature information, and generate an image of code information to be additionally printed in a position on the printed material, the code information including the first information and the second information; and
additionally print the mark and the code information on the printed material.

2. The printed material processing system according to claim 1, wherein the first printed material processing device generates and additionally prints the mark on the printed material in a manner such that the printed material can be visually determined to be valid.

3. The printed material processing system according to claim 1, wherein, when the difference is beyond an allowable range, the first printed material processing device generates an image of the mark in a manner such that the printed material can be visually determined to be invalid when the mark is additionally printed thereon, and generates an image of the code information including third information indicating that the printed material is invalid.

4. The printed material processing system according to claim 1, the system further comprising:
a second printed material processing device that processes a printed material on which image formation has been performed by the first printed material processing device, the second printed material processing device being configured to:
identify the feature information in the printed material by referring to the positional relationship included in the first information in the code information, and extract the feature quantity of the feature information in the printed material by referring to the extraction method included in the second information in the code information; and
determine whether the printed material is valid, by comparing the feature quantity extracted from the feature information in the printed material with the feature quantity included in the second information.

5. The printed material processing system according to claim 4, wherein the second printed material processing device:
compares the feature quantity extracted from the feature information in the printed material with the feature quantity included in the second information,
when the feature quantities are the same, determines the printed material to be valid, and
when the feature quantities are not the same, determines the printed material to be invalid.

6. The printed material processing system according to claim 4, wherein the code information further includes third information indicating that the printed material is invalid, and the printed material is determined to be invalid from the third information in the code information.

7. A non-transitory recording medium storing a computer readable program, the program being executable to control a computer to:
compare (i) read printed-material image information obtained by reading a printed material with (ii) suitable printed-material image information obtained in a state where image formation has been appropriately performed on the printed material;
extract a portion equivalent to a difference between the two compared sets of information as feature information;
additionally print a mark near a location of the feature information in the printed material; and
additionally print code information in a position on the printed material, the code information including first information and second information, the first information indicating a positional relationship between the mark and the feature information, and the second information indicating a method of extracting the feature information and a feature quantity to be extracted from the feature information.

8. The non-transitory recording medium according to claim 7, wherein the mark is printed in a position including the location of the feature information.

9. The non-transitory recording medium according to claim 7, wherein the mark is printed on the printed material in a manner such that the printed material can be visually determined to be valid.

10. The non-transitory recording medium according to claim 7, wherein, when the difference is beyond an allowable range, the mark is printed in a manner such that the printed material can be visually determined to be invalid, and the code information includes third information indicating that the printed material is invalid.

11. The non-transitory recording medium according to claim 7, wherein the method of extracting the feature information includes at least one of a closed-region extraction technique for extracting a closed-region area, an end-point extraction technique for extracting an end point, an edge extraction technique for extracting an edge strength or an edge form, and a texture information extraction technique for extracting a region texture strength.

12. The non-transitory recording medium according to claim 7, wherein the mark is printed on the printed material in a state visibly varying depending on whether the printed material is valid.

13. The non-transitory recording medium according to claim 7, wherein:
the mark and the code information additionally printed on the printed material are detected, and
when at least one of the mark and the code information is not detected, additional processing is performed to invalidate the printed material.

14. A non-transitory recording medium storing a computer readable program for processing the printed material obtained under control of the program stored in the non-transitory recording medium of claim 7, the program for processing the printed material being executable to control a computer to:
identify the feature information in the printed material by referring to the positional relationship included in the first information in the code information;
extract the feature quantity of the feature information in the printed material by referring to the extraction method included in the second information in the code information; and
determine whether the printed material is valid, by comparing the feature quantity extracted from the feature information in the printed material with the feature quantity included in the second information.

15. The non-transitory recording medium according to claim 14, wherein:
the feature quantity extracted from the feature information in the printed material is compared with the feature quantity included in the second information, when the feature quantities are the same, the printed material is determined to be valid, and when the feature quantities are not the same, the printed material is determined to be invalid.

16. The non-transitory recording medium according to claim 14, wherein the code information further includes third information indicating that the printed material is invalid, and the printed material is determined to be invalid from the third information in the code information.

* * * * *